United States Patent
Wolfgang

(10) Patent No.: US 6,570,843 B1
(45) Date of Patent: May 27, 2003

(54) METHOD FOR MINIMIZING THE NUMBER OF DATA PACKETS REQUIRED FOR RETRANSMISSION IN A TWO-WAY COMMUNICATION SYSTEM

(75) Inventor: H. Lewis Wolfgang, Stamford, CT (US)

(73) Assignee: KenCast, Inc., Stamford, CT (US)

( * ) Notice: Subject to any disclaimer, the term of this patent is extended or adjusted under 35 U.S.C. 154(b) by 0 days.

(21) Appl. No.: 09/314,121

(22) Filed: May 19, 1999

Related U.S. Application Data

(60) Provisional application No. 60/086,602, filed on May 22, 1998.

(51) Int. Cl.[7] .................................................. G01R 31/08
(52) U.S. Cl. ....................... 370/216; 714/746; 714/748; 714/749; 370/349
(58) Field of Search ............................. 370/230, 235, 370/249, 250, 252, 389, 253, 237, 238, 216; 714/349, 746, 748, 749

(56) References Cited

U.S. PATENT DOCUMENTS

| | | | | |
|---|---|---|---|---|
| 5,790,524 A | * | 8/1998 | Bennett et al. | 370/244 |
| 5,959,974 A | * | 9/1999 | Badt et al. | 370/233 |
| 6,012,159 A | * | 1/2000 | Fischer et al. | 714/755 |
| 6,104,757 A | * | 8/2000 | Rhee | 375/240 |
| 6,141,788 A | * | 10/2000 | Rosenberg et al. | 714/774 |

* cited by examiner

*Primary Examiner*—Alpus H. Hsu
*Assistant Examiner*—Thien D. Tran
(74) *Attorney, Agent, or Firm*—Fitzpatrick, Cella, Harper & Scinto

(57) ABSTRACT

A method is provided that reduces the total number of retransmitted packets required for retransmission from a transmitter to a receiver, the transmitter having already transmitted over a forward channel N number of packets to the receiver, and the receiver having already reported over a back channel to the transmitter information regarding which of the N packets were successfully received. Another method is provided that accounts for the likelihood that some of the retransmitted packets may be lost on retransmission, and thus increases the number of retransmitted packets accordingly.

9 Claims, 4 Drawing Sheets

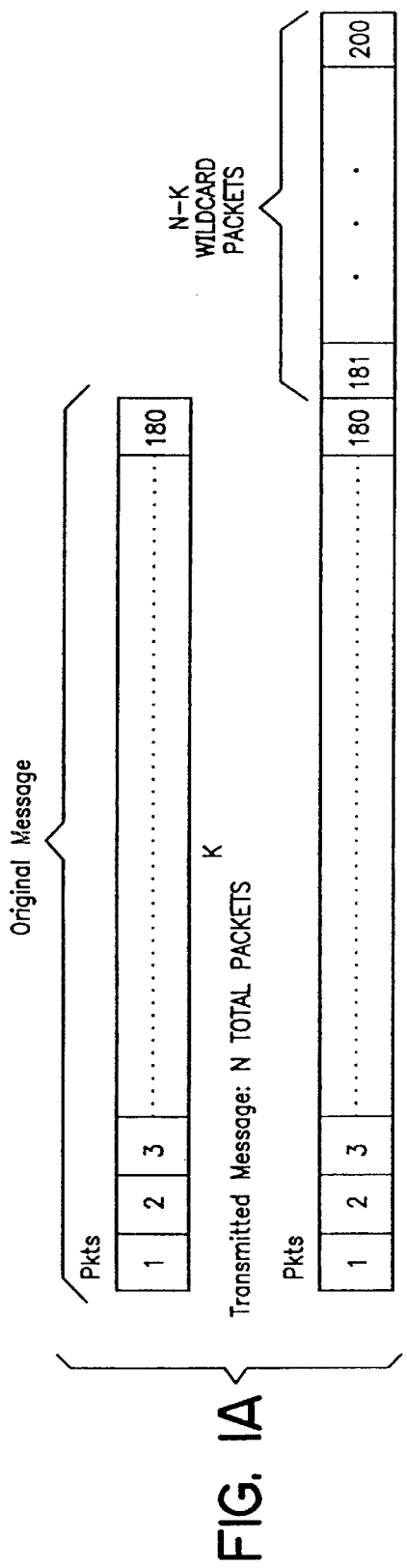
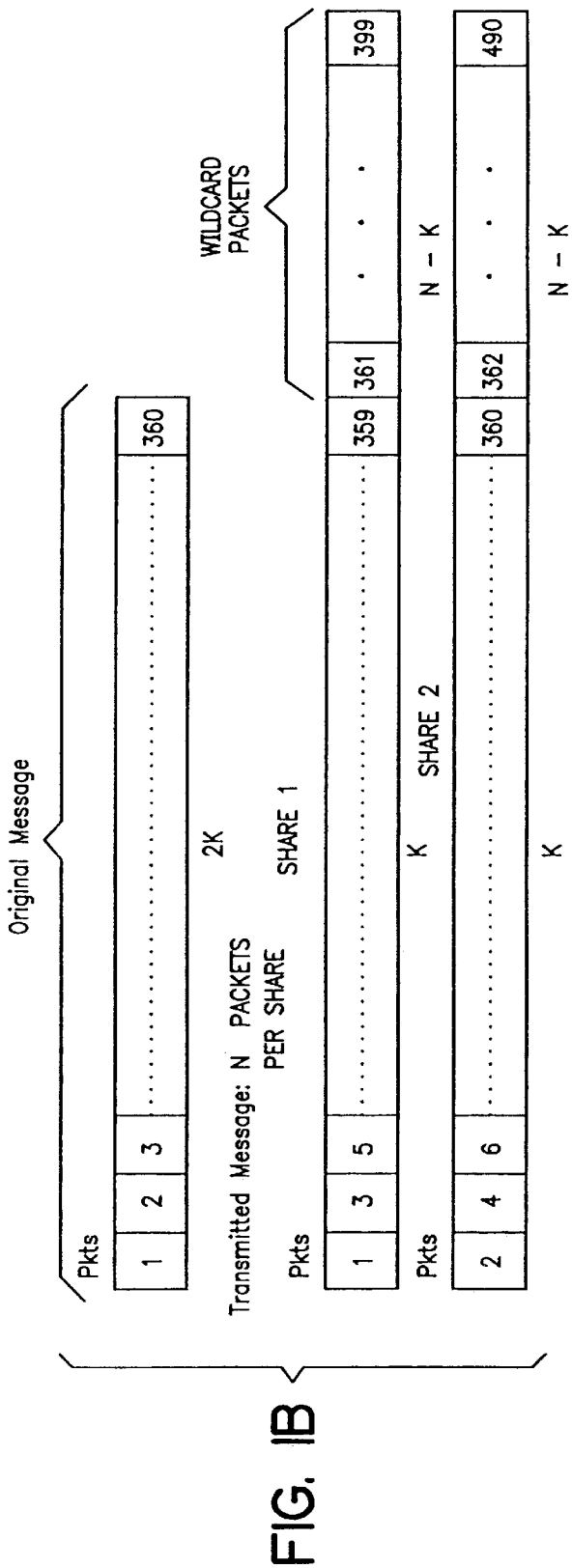
FIG. 1A
FIG. 1B

METHOD FOR MINIMIZING THE NUMBER OF DATA PACKETS REQUIRED FOR RETRANSMISSION IN A TWO-WAY COMMUNICATION SYSTEM

CROSS-REFERENCE TO RELATED APPLICATION

This application claims the benefit of U.S. Provisional Application No. 60/086,602, filed May 22, 1998.

BACKGROUND OF THE INVENTION

1. Field of the Invention

The present invention relates to a method for minimizing the number of packets that need to be retransmitted in a two-way communication system having forward and back communication channels.

2. Description of Related Art

Computer users often transfer files of data, usually large, multimedia data files containing, for example, digitized music, still images or moving images, between a transmitter computer host and one or more subscriber (remote) receiver computers of a communication system. The communication system is generally referred to as a "one-to-many" communication system, and may be, for example, a two-way satellite broadcast system or a computer network, such as the Internet. It is highly desirable that these large files are transferred error-free despite the effects of various types of noise interfering with the transmitted signal.

In general, the data bits or symbols (such as bytes) of the file to be transmitted are most likely to be organized into larger groups called packets. When a file is sent, header packets preceding the information packets are sent. Those header packets contain the address and control information to ensure that the following packets are received by the addressed subscriber computers. Moreover, each packet itself includes header bytes that indicate, inter alia, to which file the packet belongs and the position of the packet within that file. The remaining bytes of the packet are the body which includes the informational data, such as compressed video data. For example, a packet may be 4,096 bytes long, wherein the header portion is the first 16 bytes, and the body portion is the remaining 4,080 bytes. A file is thus transmitted over the forward channel of a two-way communication channel as a sequence of packets.

Occasionally, a subscriber computer does not receive all of the transmitted packets successfully. In particular, some of the transmitted packets may be identified as "lost", or as uncorrectably erroneous ("bad"), by the subscriber computer because of various types of noise interfering with the transmitted signal (hereinafter, for brevity, both the lost and bad packets will be referred to as "lost"). For example, a host computer may send a packetized file to two subscriber computers A and B. For any number of reasons, the transmitted packets may experience different degrees and types of noise in the respective communication channels between the host computer and the subscriber computers A and B. Because of this, subscriber computer A may lose 20% of the transmitted packets, while subscriber computer B may lose only 5% of the transmitted packets. Generally, there may be hundreds or thousands of remote subscriber computers, with each subscriber computer possibly losing one or more of the transmitted packets due to noise between it and the transmitting host computer.

To correct for these packet losses, it is possible to retransmit over the forward channel the packets of the entire file to all of the subscriber computers. However, this method is costly, wastes time and bandwidth, and prevents the communication system from being used for other purposes. It is especially wasteful since most subscribers will lose only a few packets out of the entire file, and furthermore, there is no guarantee that the retransmitted packets will not also be lost.

Instead, back channels may be respectively provided between each subscriber computer and the host computer so that information regarding which packets were successfully received and which were lost can be sent back from the subscriber computers to the host computer. Using this information, the host computer is able to retransmit over the forward channel only the lost packets to the subscriber computers. Each back channel usually takes the form of a modem and telephone line, or may be part of a standard computer network, such as a LAN or the Internet. The back channel can also be linked through a satellite, although this may be more expensive. Other types of back channels may also be used, as will be appreciated by one skilled in the art.

Retransmission of lost packets in this fashion also requires a retransmission protocol between the host computer and the subscriber computers to determine when, and under what conditions, the retransmission is to be performed. For example, retransmission may be performed periodically, regardless of whether or not the host computer has received lost packet information from all of the subscriber computers. Alternatively, the host computer may actively seek out the lost packet information from each and every subscriber computer by polling them, and retransmit only after the polling has been completed. Of course, other retransmission protocols may be used, as will be appreciated by one skilled in the art.

In a simple transmission and retransmission approach, the host computer transmits over the forward channel the packets of a file. The host computer also saves these packets for possible retransmission. Upon reception, each subscriber computer creates a list of which packets were successfully received and which packets were lost, and sends that list to the host computer over its back channel. From these lists, the host computer accumulates a set of all of the lost packets required by the subscriber computers (none of the lost packets are repeated in this set). The host computer then retransmits over the forward channel the set of accumulated lost packets, and assuming the retransmitted packets are successfully received, the subscriber computers are able to successfully reconstruct the file.

However, this approach becomes increasingly inefficient for large numbers of subscriber computers, because each subscriber computer generally loses packets different from those lost by the other subscriber computers, thus causing the number of retransmitted packets to increase dramatically. In fact, the number of retransmission packets may begin to approach the entire number of originally transmitted packets, thus causing this approach to become as inefficient as retransmission without using back channels (in which the entire file is retransmitted). Furthermore, this approach has no way to account for the possible loss of some of the retransmitted packets on retransmission.

SUMMARY OF THE INVENTION

It would thus be desirable to provide a method that overcomes the above-described problems, especially in the case of a large number of subscriber computers communicating with a host computer. In particular, a method is provided that reduces the total number of retransmitted packets. Another method is provided that accounts for the likelihood that some of the retransmitted packets may be lost on retransmission, and thus increases the number of retransmitted packets accordingly.

BRIEF DESCRIPTION OF THE DRAWINGS

The various aspects of the present invention can be best understood by reference to the detailed description of the preferred embodiments set forth below taken with the drawings, in which:

FIG. 1A depicts an example of a file of packets including original packets and wildcard packets;

FIG. 1B depicts an example of a file with shares of interleaved packets;

DETAILED DESCRIPTION OF THE PREFERRED EMBODIMENTS

Figure 2:
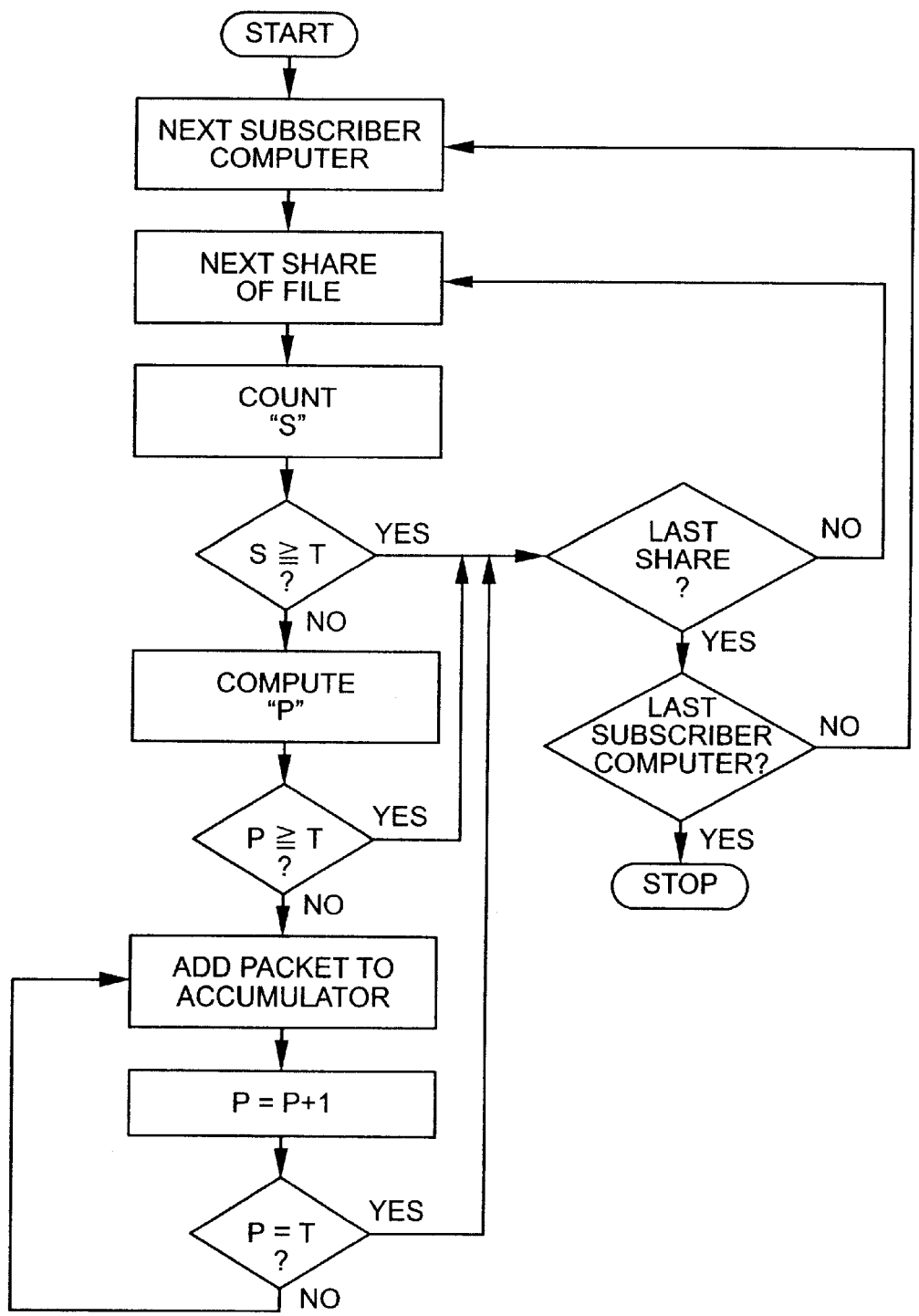
FIG. 2 is a flowchart of a method in accordance with a first embodiment of the present invention.

U.S. patent application Ser. No. 08/785,443, which is incorporated herein by reference, discloses a method for reliably transferring original packets of data between a transmitter host and one or more subscriber receivers in a communication system. In particular, that patent application provides various packet-level forward error correction (FEC) coding techniques to ensure that large files are received error-free despite the effects of various types of noise interfering with the transmitted signal.

In the techniques described in U.S. patent application Ser. No. 08/785,443, an extra number (N−K) of "wildcard" error correcting packets are encoded and transmitted with K original packets to provide a predetermined level of protection against packet loss. For example, as shown in FIG. 1A, if a file contains K=180 original packets, an extra (N−K)=20 wildcard packets may be encoded and transmitted with those 180 original packets, for a total of N=200 packets, to provide against a loss of 20 original packets (approximately an 11% loss). Packet-level error detection processing is provided in the receiving subscriber computers to indicate whether a received packet is "good" (correct) or "bad" (erroneous and cannot be corrected). Also, an indication is made if a packet has not been received at all, i.e., "lost". The bad packets are marked as lost and are not used in further decoding. As long as the number of lost packets does not exceed the number N−K of wildcard packets, the K original packets of the file may be completely and correctly reconstructed. Continuing the above example, this means that at least 180 packets of the 200 transmitted packets must be received as "good" packets to allow the reconstruction of the original 180 packets. The techniques for decoding the received "good" packets to reconstruct the original packets are described more fully in the above-identified patent application.

Additionally, as also described in U.S. patent application Ser. No. 08/785,443, a large file may be broken into smaller "chunks" or "shares", each of which generally contains the same number of packets, to allow the large file to be transmitted and received by the system. Each share is individually encoded, transmitted, received and reconstructed (decoded). The file is made whole from the individually reconstructed shares. As also discussed therein, the packets of the shares may also be interleaved to provide additional protection against noise. For example, a data file of 360 original packets and 40 wildcard packets may be divided into two shares of 200 interleaved packets each, as shown in FIG. 1B. Of course, as the files become larger, the number of shares will increase. For the same reasons mentioned above, for each share to be successfully reconstructed, at least 180 packets of the 200 transmitted share packets must be received as "good" packets.

Accordingly, for any file or share thereof, at least K packets from the total of N transmitted packets must be successfully received to perform reconstruction using the FEC methods of U.S. patent application Ser. No. 08/785,443. Thus, for the FEC methods of U.S. patent application Ser. No. 08/785,443, K is a "target number" T of packets that a subscriber computer needs to receive for successful reconstruction. The subscriber computer may have other target numbers depending on what other processing the subscriber computer intends to perform. For example, if the subscriber computer is performing verification processing or location processing, as described in a U.S. patent application entitled "METHOD FOR VALIDATING COMMUNICATED PACKETS OF DATA AND FOR LOCATING ERRONEOUS PACKETS", filed on the same day as the present application, T may be respectively K+1 (for verification processing) or K+2 packets (for error location processing), instead of K packets. In general, T is any number of desired packets to be received from the N total number of packets transmitted per file or share. Notably, the present invention does not require the use of the methods in the above-identified patent applications. For example, any other packet-level FEC or other processing requiring a target number T may be used. Although not a requirement of the present invention, for a clearer and more concise disclosure, it will be assumed hereinafter that a file is divided into packets, which in turn are distributed into interleaved shares, each of which can be considered complete (or reconstructible) when any T of the N total packets have been successfully received.

One goal of the present invention is to use the knowledge that only a target number T of packets is required to be successfully received to reduce the number of packets that need to be retransmitted to the subscriber computers over the forward channel. As discussed in the Background Section, the host computer has exact knowledge of which packets have and have not been successfully received by the remote subscriber computers, by the information sent from the remote subscriber computers to the host computer over the back channel. As also discussed in the Background Section, the host computer accumulates a set of packets for retransmission based on this knowledge. In particular, the host computer maintains a list of packets to be retransmitted, which will be referred to as the "accumulator". The host computer considers each remote subscriber computer in turn and updates the set of packets to be retransmitted in the accumulator.

To reduce the number of packets that need to be retransmitted, in a first embodiment of the present invention, a host computer is provided with the method shown in FIG. 2. This method uses the information provided to the host computer by each subscriber computer through its back channel. It will be assumed that the accumulator of the host computer already contains packets to be retransmitted for any subscriber computer previously processed by this method (if none, then the accumulator is empty). For a given subscriber computer, for each share of a file, it is desired to retransmit enough packets to reach the target number T of that share. Based on the information received through the back channel, the host computer counts the number of successfully received packets of that share, denoted as "S". The host computer then determines whether S is greater than or equal to T. If so, no further packets need to be retransmitted for that share, because the subscriber computer was already able to accomplish the required processing for that share on the original transmission. For example, if S=T=K, the subscriber computer was able to successfully reconstruct the share using the packet-level FEC method disclosed in U.S. patent application Ser. No. 08/785,443. Thus, no packets are added to the accumulator and the next share of the file is considered.

If, however, S<T, then the host computer needs to determine how many packets its needs to add to the accumulator for retransmission for this particular share. To do this, the host computer needs to project the number of packets that the subscriber computer is expected to have after successful retransmission and reception. The host computer thus counts the number of packets that are already in the accumulator that are missing from, and thus, needed by this particular subscriber computer, and adds to that the number of packets the subscriber has already successfully received, that is, S. This projected number will be denoted as "P". If P is greater than or equal to T, then no additional packets need to be added to the accumulator for this share, since after successful retransmission and reception, the subscriber computer will have enough packets for processing. The host computer will then consider the next share of the file.

Otherwise, if P<T, packets need to be added to the accumulator for this share for this particular subscriber computer. The host computer thus adds to the accumulator packets which were not successfully received in the share by the subscriber computer and which are not already in the accumulator, until P=T (P is increased by one for each added packet). For example, the host computer may start with the last packet in the share and work backwards to determine whether or not the packet can be added, and if so, add it to the accumulator (although this order of processing is not required). When P=T, the next share is considered by the host computer.

This processing is sequenced through all shares of a particular file for all of the subscriber computers which reported to the host computer their lists of received and lost packets. At the end of processing for a given file, the host computer will retransmit the accumulated set of packets to all of the subscriber computers over the forward channel. As will be readily appreciated, this method greatly reduces the number of retransmitted packets since only a quantity of packets additionally needed to meet the target number T after retransmission are added to the accumulator.

In a second embodiment of the present invention, another method of accumulating a set of retransmission packets is provided. In this method, the host computer examines the past performance of transmission to each of the remote subscriber computers and attempts to compensate for any packets lost due to relatively poor performance by accumulating and retransmitting additional packets.

The accumulator is generally the same as described above in the first embodiment. That is, each share of the file for each remote subscriber computer is considered in sequence. In this embodiment, however, whenever the host computer considers a remote subscriber computer, it determines whether the past transmission history with respect thereto has resulted in lost packets, and if so, it may give the accumulator a "boost" of additional packets to compensate therefor.

Figure 3:
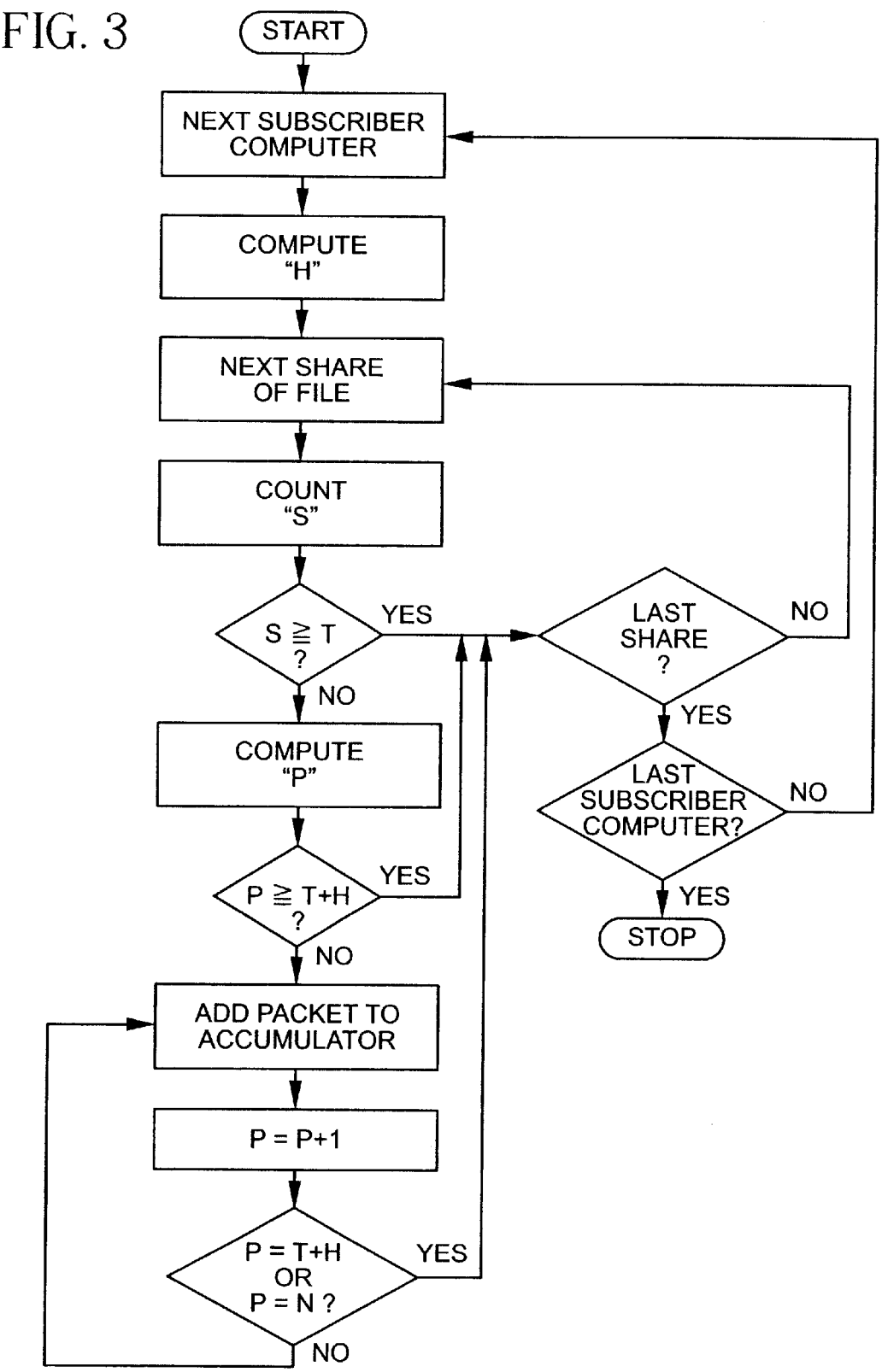
FIG. 3 is a flowchart of a method in accordance with another embodiment of the present invention.

The method of the second embodiment is shown in FIG. 3. It will be assumed that the accumulator of the host computer already contains retransmission packets for subscriber computers previously processed by this method (if none, then the accumulator is empty). For each subscriber computer, the host computer first calculates the number of additional packets to add to the retransmission for each share by using historical transmission performance data. These additional packets will be retransmitted to account for the likely loss of art of the retransmission. One technique used by the host computer to calculate a quantity "history boost", enoted as H, is described as follows:

$H$=smallest integer greater than $\{(TPL*(TPL-TNE))/(TNP*TNS)\}$, if the bracketed quantity is greater than zero;

or $H$=1, if the bracketed quantity is zero or less, wherein:
TPL=Total Packets Loss by this subscriber computer during transmission of all shares of the file;
TNS=Total Number of Shares in the file;
TNE=Total Number of Extra packets transmitted, whereby TNE is equal to $(N-T)*TNS$, where N is the total number of packets per share, and T is the target number of packets required for processing each share;
TNP=Total Number of Packets, which is equal to $N*TNS$.

For a particular subscriber computer, for each share, the host computer counts S and determines whether S is greater than or equal to T (S and T represent the same quantities here as in the first embodiment). If so, no further packets need to be retransmitted for that share, since the desired number of packets have already been successfully received. If S<T, then the host computer needs to determine how many packets it needs to add to the accumulator for retransmission for this particular share. To do this, the host computer first computes P (P represents the same quantity here as in the first embodiment). In the second embodiment, if P is greater than or equal to T+H, then no additional packets need to be added to the accumulator for this share, since after retransmission and reception, assuming no more than H of the retransmitted packets under consideration for this share are lost, the subscriber computer will have enough packets for processing. Otherwise, if P<T+H, additional packets are needed in the accumulator for this share of this subscriber computer. The host computer thus adds to the accumulator packets which were not successfully received in the share by the subscriber computer and that are not already in the accumulator, until (1) P=T+H (P is increased by one for each added packet), or (2) P=N (since T+H may on occasion exceed N—in this case, all packets of the share in question which were not received by the subscriber computer currently being considered have been added to the accumulator).

This processing is sequenced through all shares of a particular file for all of the subscriber computers which reported to the host computer their list of received and lost packets. At the end of processing for a given file, the host computer will retransmit the accumulated set of packets to all of the subscriber computers over the forward channel. For the same reasons as in the first embodiment, the method of the second embodiment will also significantly reduce the number of retransmitted packets as compared to the simple approach described in the Background Section. However, unlike the method of the first embodiment, the history boost H used in the second embodiment may cause some additional packets to be added to the accumulator to account for predicted packet losses during retransmission.

In either the first or second embodiments, the accumulator may be updated as each subscriber computer reports in over the back channel, so that the accumulator always reflects all of the information so far received. It is possible to retransmit the packets listed in the accumulator at any given time, without necessarily waiting for information to be received from all of the subscriber computers.

Figure 4:
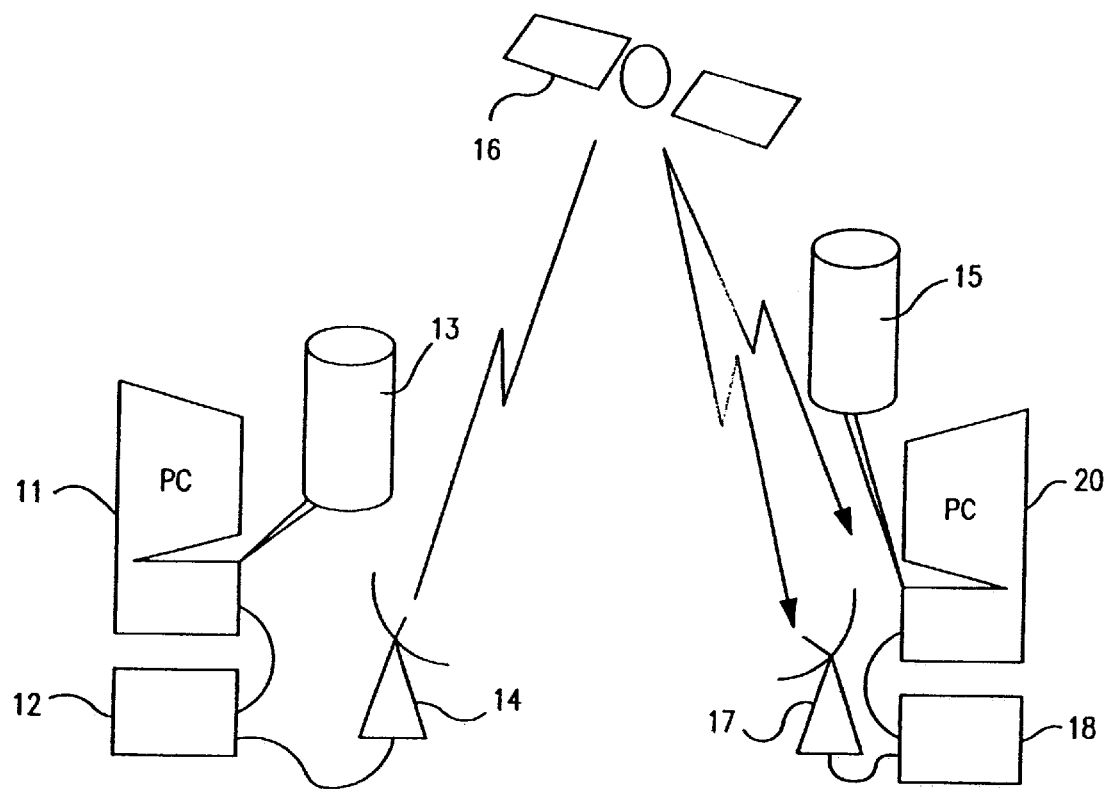
FIG. 4 depicts a system in which the methods of the first and second embodiments may be used.

A block diagram of one possible communication system that implements the above methods is shown in FIG. 4. This is a two-way satellite broadcast system, and includes a host computer 11, usually a PC. The host computer 11 includes or is extended with a transmission communication device 13 for the transfer of data outside the computer. The communication device can take the form of a serial card or a computer chip. The communication device 13 is connected by a cable to a satellite transmitter device 12. The satellite transmitter device 12, through an attached uplink antenna 14, broadcasts the packets to one or more subscriber computers 20 via satellite 16 (forward channel). This forward channel is also used later when rebroadcasting to the subscriber computers the packets listed in the accumulator of the host computer.

The packets are received by a downlink antenna 17 (usually submeter in diameter) attached to a satellite receiver device 18, which in turn is connected to subscriber computer 20, usually a PC. The subscriber computer 20 includes or is extended with a reception communication device 15 to transfer the received packets into the subscriber computer. A back channel 30 is provided from each subscriber computer to the host computer to transmit thereto the list of which packets were successfully received and which were lost.

The methods of the first and second embodiments may be implemented (1) by computer software, (2) by dedicated hardware, or (3) by combinations of software, hardware and firmware. The computer software may run on a Windows® 95 or Windows® NT® operating system. The software preferably runs on a Pentium® 133 MHz PC or better with at least 16 Mbyte RAM and a 1 Gbyte hard drive for storage of the large digital object files.

In addition to the high speed transmission communication device, the host computer may be set up with a relational database, a graphical user interface, and list/addressing software and transmission communication software to communicate with the transmission communication device. Data files are transmitted and received using a packet-based broadcast protocol at speeds of over 8.44 Mbps in a dedicated computer. In addition to the high speed receiver communication card, the subscriber computer may be set up with a local database, a graphical user interface and receive communication software to communicate with the receiver communication device.

Any type of digital file may be transmitted and received. These files may include, but are not limited to, video files (MPEG, M-JPEG), electronic documents (PDF), color images (TIF), press clippings, interactive training (CD-I, CD-ROM), news feeds, music and audio (WAV), compound documents, and other multimedia files.

Of course, it will be appreciated that the invention may take forms other than those specifically described. For example, these methods may be used in other two-way communication systems or computer systems with back channels, such as the Internet or local area networks.

What is claimed is:

1. A method for minimizing the number of packets required for retransmission from a transmitter to a receiver, the transmitter having already transmitted over a forward channel N number of packets to the receiver, and the receiver having already reported over a back channel to the transmitter information regarding which of the N packets were successfully received, said method comprising the steps of:

(1) determining from the reported back channel information a number S of successfully received packets;
   (2) determining whether S is less that a target packet number T;
   (3) if so, determining a projected number of packets P equal to S plus the number of packets that already exist in a packet accumulator and were not successfully received by the receiver;
   (4) determining whether P is less than T;
   (5) if so, adding to the packet accumulator a packet not successfully received by the receiver and incrementing P by one;
   (6) determining whether P is equal to T and if not, repeating step (5) until P is equal to T; and
   (7) wherein N, P, S and T are integers and greater than 0.

2. A method according to claim 1, wherein a data file comprises a plurality of shares of packets, and the number N represents the number of packets transmitted for any one of those shares.

3. A method according to claim 2, wherein steps (1) through (6) are repeated for each share of the data file.

4. A method according to claim 1, wherein the N number of packets is transmitted over a plurality of forward channels to a respective plurality of receivers, and at least one of the receivers has already reported over a respective back channel to the transmitter information regarding which of the N packets were successfully received by that receiver, and wherein steps (1) through (6) are repeated for each reporting receiver.

5. A method for minimizing the number of packets required for retransmission from a transmitter to a receiver, the transmitter having already transmitted over a forward channel N number of packets to the receiver, and the receiver having already reported over a back channel to the transmitter information regarding which of the N packets were successfully received, said method comprising the steps of:

(1) determining from the reported back channel information a number S of successfully received packets;
   (2) determining whether S is less than a target packet number T;
   (3) if so, determining a projected number of packets P equal to S plus the number of packets that already exist in a packet accumulator and were not successfully received by the receiver;
   (4) determining a boost number of packets H;
   (5) determining whether P is less that (T+H);
   (6) if so, adding to the packet accumulator a packet not successfully received by the receiver and incrementing P by one;
   (7) determining whether P is equal to (T+H) or whether P is equal to N, and if both such determinations are no, repeating step (6) until either P is equal to (T+H) or P is equal to N; and
   (8) wherein H, N, P, S and T are integers and greater than 0.

6. A method according to claim 5, wherein a data file comprises a plurality of shares of packets, and the number N represents the number of packets transmitted for any one of those shares.

7. A method according to claim 6, wherein steps (1) through (7) are repeated for each share of the data file.

8. A method according to claim 7, wherein H is equal to the smallest integer greater than a bracketed quantity {(TPL*(TPL−TNE))/(TNP*TNS)}, if the bracketed quantity is greater than zero, or H is equal to 1, if the bracketed quantity is zero or less, wherein TPL="Total Packets Loss" by the receiver during transmission of all shares of packets of the data file, TNS="Total Number of Shares" =in the data file, TNE ="Total Number of Extra" packets transmitted, whereby TNE is equal to (N−T)*TNS, and TNP ="Total Number of Packets", which is equal to N*TNS.

9. A method according to claim 5, wherein the N number of packets is transmitted over a plurality of forward channels to a respective plurality of receivers, and at least one of the receivers has already reported over a respective back channel to the transmitter information regarding which of the N packets were successfully received by that receiver, and wherein steps (1) through (7) are repeated for each reporting receiver.

* * * * *